US009398309B2

United States Patent
Park et al.

(10) Patent No.: US 9,398,309 B2
(45) Date of Patent: Jul. 19, 2016

(54) APPARATUS AND METHOD FOR SKIPPING FRACTIONAL MOTION ESTIMATION IN HIGH EFFICIENCY VIDEO CODING

(71) Applicant: ELECTRONICS AND TELECOMMUNICATIONS RESEARCH INSTITUTE, Daejeon (KR)

(72) Inventors: Seong-Mo Park, Daejeon (KR); Seung-Hyun Cho, Daejeon (KR); Hyun-Mi Kim, Incheon (KR); Kyung-Jin Byun, Daejeon (KR); Nak-Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 329 days.

(21) Appl. No.: 14/264,610

(22) Filed: Apr. 29, 2014

(65) Prior Publication Data

US 2014/0341270 A1    Nov. 20, 2014

(30) Foreign Application Priority Data

May 14, 2013   (KR) ........................ 10-2013-0054350

(51) Int. Cl.
| | |
|---|---|
| *H04N 19/51* | (2014.01) |
| *H04N 19/557* | (2014.01) |
| *H04N 19/176* | (2014.01) |
| *H04N 19/139* | (2014.01) |
| *H04N 19/119* | (2014.01) |
| *H04N 19/96* | (2014.01) |
| *H04N 19/109* | (2014.01) |

(52) U.S. Cl.
CPC ........... *H04N 19/557* (2014.11); *H04N 19/109* (2014.11); *H04N 19/119* (2014.11); *H04N 19/139* (2014.11); *H04N 19/176* (2014.11); *H04N 19/96* (2014.11)

(58) Field of Classification Search
None
See application file for complete search history.

(56) References Cited

U.S. PATENT DOCUMENTS

2003/0112872 A1   6/2003   Park et al.

FOREIGN PATENT DOCUMENTS

KR   10-2009-0079286   7/2009

OTHER PUBLICATIONS

Vanne, Jarno, et al. "Comparative rate-distortion-complexity analysis of HEVC and AVC video codecs." Circuits and Systems for Video Technology, IEEE Transactions on 22.12 (2012): 1885-1898.*
Shen, Liquan, et al. "An Adaptive Fractional Pixel Search Algorithm. "Intelligent Sensing and Information Processing, 2006. ICISIP 2006. Fourth International Conference on. IEEE, 2006.*
Andy Chia Woo Yu et al., "Fast Inter-Mode Selection in the H.264/AVC Standard Using a Hierarchial Decision Process", IEEE Transactions on Circuits and Systems for Video Technology, vol. 18, No. 2, dated, Feb. 2008, pp. 186-195.

* cited by examiner

Primary Examiner — Sath V Perungavoor
Assistant Examiner — Clifford Hilaire
(74) Attorney, Agent, or Firm — Kile Park Reed & Houtteman PLLC

(57) ABSTRACT

An apparatus and method for skipping fractional motion estimation (FME) in high efficiency video coding (HEVC) are disclosed. The apparatus includes a current sum of absolute differences (SAD) acquisition unit, a redundancy determination unit, and a motion estimation skip unit. The SAD acquisition unit acquires the SAD from an integer motion estimation (IME) unit when the IME unit performs IME on a coding tree block (CTB). The redundancy determination unit determines whether or not the CTB is an estimated redundant block using the current SAD. The motion estimation skip unit provides an FME unit with an FME skip signal of the CTB depending on whether or the CTB is an estimated redundant block.

18 Claims, 3 Drawing Sheets

APPARATUS AND METHOD FOR SKIPPING FRACTIONAL MOTION ESTIMATION IN HIGH EFFICIENCY VIDEO CODING

CROSS REFERENCE TO RELATED APPLICATION

This application claims the benefit of Korean Patent Application No. 10-2013-0054350, filed on May 14, 2013, which is hereby incorporated by reference in its entirety into this application.

BACKGROUND OF THE INVENTION

1. Technical Field

The present invention relates generally to an apparatus and method for skipping fractional motion estimation (FME) in high efficiency video coding (HEVC) and, more particularly, to an apparatus and method for skipping FME in HEVC using the sum of absolute differences (SAD) on a coding tree block (CTB) basis.

2. Description of the Related Art

HEVC (high efficiency video coding), which is a next-generation multimedia moving image compression standard, exhibits a compression ratio twice as high as existing H.264/AVC in terms of subjective picture quality and a compression ratio 1.5 times as high as existing H.264/AVC in terms of objective picture quality.

In general, HEVC is problematic in that the computational load of FME increases upon encoding because more various block sizes are used than in existing H.264/AVC, which directly leads to an increase in encoding rate and an increase in the hardware area of an encoder when a System On a Chip (SoC) is implemented.

In the HEVC standard, an increase in the encoding rate attributable to a reduction in the computational load of FME and a reduction in the hardware area of the encoder when implementing an SoC have become important factors.

U.S. Patent Application Publication No. 2003-0112872 discloses a method of performing mixed motion evaluation based on hierarchical search, in which a current SAD value is compared with a maximum SAD value and integer motion estimation (IME) is skipped if the current SAD value is smaller than the maximum SAD value.

Korean Patent Application Publication No. 2009-0079286 discloses a moving image motion estimation method and apparatus using a high-speed global search block matching algorithm, in which a partial SAD value is compared with a minimum SAD value and then IME is skipped.

Additionally, a thesis entitled "Fast Inter-Mode Selection in the H.264/AVC Standard Using a Hierarchical Decision Process" published on "TCSVT", Vol. 18, No 2, Page 186 discloses a high-speed inter-mode selection method using hierarchical determination processing in the H.264/AVC standard, in which complexity is reduced in hierarchical stepwise processing.

However, the above conventional technologies disclose only a technology for omitting IME or reducing complexity in hierarchical stepwise processing, but do not disclose and suggest a technology for comparing a current SAD value with a previous SAD value on a CTB basis and skipping FME based on the results of the comparison. Furthermore, the conventional technologies are interested only in H.264/AVC, but do not mention an increase in the computational load of FME attributable to more various block sizes in HEVC.

In order to overcome an increase in the computational load of FME in the HEVC standard, when a calculated value using a current SAD value is larger than a calculated value using a previous SAD, a method of skipping FME and setting a weight applied to the previous SAD to a value lower than a weight applied to the current SAD is used because this case has a good possibility of redundant information in which FME results overlap IME results. This increases a probability of redundant information being eliminated compared to the case where the current SAD value is simply compared with the previous SAD value, thereby enabling more rapid HEVC to be achieved. Accordingly, there is an urgent need for this type of new FME skip technology in HEVC.

SUMMARY OF THE INVENTION

At least one embodiment of the present invention is intended to provide an apparatus or method for skipping FME in HEVC, in which a current SAD value is compared with a previous SAD value on a CTB basis and then FME is skipped based on the results of the comparison, thereby enabling more rapid HEVC to be achieved.

At least one embodiment of the present invention is intended to provide an apparatus or method for skipping FME in HEVC, in which, if a calculated value using a current SAD value is larger than a calculated value using a previous SAD value, FME is skipped because this case has a good possibility of redundant information in which FME results overlap IME results, thereby enabling more rapid HEVC to be achieved.

At least one embodiment of the present invention is intended to provide an apparatus or method for skipping FME in HEVC, in which a weight applied to a previous SAD value is set to a value lower than to a weight applied a current SAD value, and thus the probability of redundant information being eliminated is increased compared to the case where a current SAD value is simply compared with a previous SAD value, thereby enabling more rapid HEVC to be achieved.

In accordance with an aspect of the present invention, there is provided an apparatus for skipping fractional motion estimation (FME) in high efficiency video coding (HEVC), the apparatus including a current sum of absolute differences (SAD) acquisition unit configured to acquire the SAD from an integer motion estimation (IME) unit when the IME unit performs IME on a coding tree block (CTB); a redundancy determination unit configured to determine whether or not the CTB is an estimated redundant block using the current SAD; and a motion estimation skip unit configured to provide an FME unit with an FME skip signal of the CTB depending on whether or the CTB is an estimated redundant block.

The redundancy determination unit may calculate a first calculated value using the current SAD and a first weight, may calculate a second calculated value using a previous SAD acquired from a previous CTB and a second weight, and may determine whether or not the CTB is an estimated redundant block depending on which of the first and second calculated values is larger.

If the first calculated value is larger than the second calculated value, the redundancy determination unit may determine the CTB to be an estimated redundant block.

The first calculated value may be acquired by multiplying the current SAD by the first weight; and the second calculated value may be acquired by multiplying the previous SAD by the second weight.

The first weight may be larger than the second weight.

The apparatus may further include a SAD storage unit configured to store the current SAD.

The first weight may be 1.

The second weight may be 1.

The first calculated value may be acquired by dividing the current SAD by the first weight; and the second calculated value may be acquired by dividing the previous SAD by the second weight.

The first weight may be smaller than the second weight.

In accordance with an aspect of the present invention, there is provided a method of skipping fractional motion estimation (FME) in high efficiency video coding (HEVC), the method including acquiring the current sum of absolute differences (SAD) from an integer motion estimation (IME) unit when the IME unit performs IME on a coding tree block (CTB); determining whether or not the CTB is an estimated redundant block using the current SAD; and providing an FME unit with an FME skip signal of the CTB depending on whether or the CTB is an estimated redundant block.

Determining whether or not the CTB is an estimated redundant block may include calculating a first calculated value using the current SAD and a first weight, calculating a second calculated value using a previous SAD acquired from a previous CTB and a second weight, and determining whether or not the CTB is an estimated redundant block depending on which of the first and second calculated values is larger.

Determining whether or not the CTB is an estimated redundant block may include determining the CTB to be an estimated redundant block if the first calculated value is larger than the second calculated value.

The first calculated value may be acquired by multiplying the current SAD by the first weight; and the second calculated value may be acquired by multiplying the previous SAD by the second weight.

The first weight may be larger than the second weight.

The method may further include storing the current SAD.

The first weight may be 1.

The second weight may be 1.

The first calculated value may be acquired by dividing the current SAD by the first weight; and the second calculated value may be acquired by dividing the previous SAD by the second weight.

The first weight may be smaller than the second weight.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
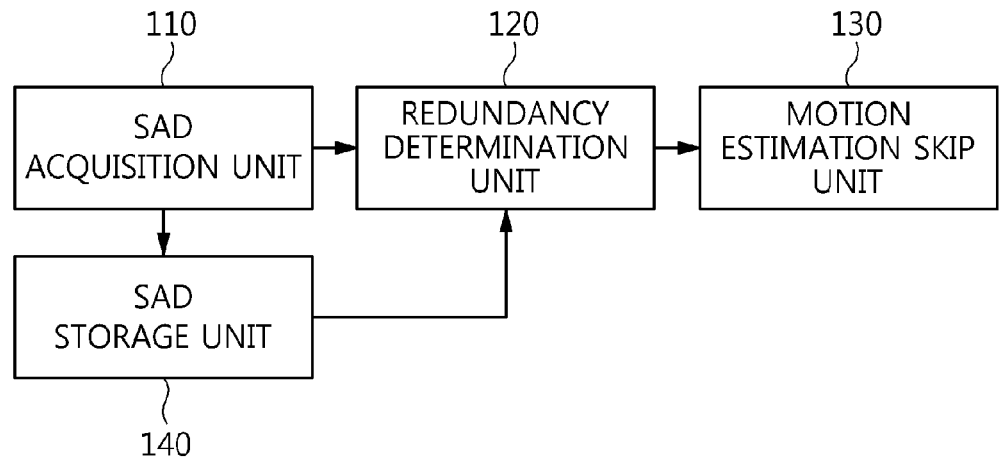
FIG. 1 is a block diagram showing an apparatus for skipping FME in HEVC according to an embodiment of the present invention.

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

FIG. 1 is a block diagram showing an apparatus for skipping FME in HEVC according to an embodiment of the present invention.

Referring to FIG. 1, the apparatus 100 for skipping FME in HEVC according to this embodiment of the present invention includes a SAD acquisition unit 110, a redundancy determination unit 120, and a motion estimation skip unit 130.

The SAD acquisition unit 110 acquires the current SAD of a CTB from an IME unit when the IME unit performs IME on the CTB.

The current SAD may be any one of SADs that are acquired when the IME unit performs IME on a current image and a previous image on a CTB basis.

The IME unit may include an image storage unit configured to store a current image and a previous image, a SAD calculation unit, and a minimum motion vector selection unit.

The IME unit may be controlled by a top controller.

The CTB may include a current block, a left block, an upper block, and an upper-right block.

The redundancy determination unit 120 determines whether or not the CTB is an estimated redundant block by using the current SAD.

The redundancy determination unit 120 may calculate a first calculated value using the current SAD and a first weight, may calculate a second calculated value using previous SAD, acquired from the previous CTB, and a second weight, and may determine whether or not the CTB is an estimated redundant block depending on which of the first and second calculated values is larger.

If the first calculated value is larger than the second calculated value, the redundancy determination unit 120 may determine the CTB to be an estimated redundant block.

The first calculated value may be acquired by multiplying the current SAD by a first weight, and the second calculated value may be acquired by multiplying the previous SAD by a second weight.

The first weight may be larger than the second weight.

For example, if the first weight is 1, the second weight may be 0.7.

For another example, if the second weight is 1, the first weight may be 1.4.

In this case, the first weight may be 1.

For example, if the first weight is 1, the redundancy determination unit 120 may set the current SAD to the first calculated value, may calculate the second calculated value using the previous SAD and a second weight, and may determine whether or not the CTB is an estimated redundant block depending on which of the first and second calculated values is larger.

In this case, the second weight may be 1.

For example, if the second weight is 1, the redundancy determination unit 120 may calculate the first calculated value using the current SAD and a first weight, may set the previous SAD to be the second calculated value, and may determine whether or not the CTB is an estimated redundant block depending on which of the first and second calculated values is larger.

In this case, the first calculated value may be acquired by dividing the current SAD by the first weight, and the second calculated value may be acquired by dividing the previous SAD by the second weight.

In this case, the first weight may be smaller than the second weight.

For example, if the second weight is 1, the first weight may be 0.7.

For another example, if the first weight is 1, the second weight may be 1.4.

The motion estimation skip unit 130 provides the FME unit with the FME skip signal of the CTB depending on whether or not the CTB is an estimated redundant block.

In this case, the FME unit may include an image storage unit configured to store a current image and a previous image, a half pixel calculation unit, a ¼ pixel calculation unit, an FME control unit, and an address generation unit.

In this case, the FME unit may be controlled by a top controller.

The FME skip apparatus in HEVC according to an embodiment of the present invention may further include a SAD storage unit 140 configured to store the current SAD.

The SAD storage unit 140 may provide the stored current SAD to the redundancy determination unit 120 as the previous SAD.

Figure 2:
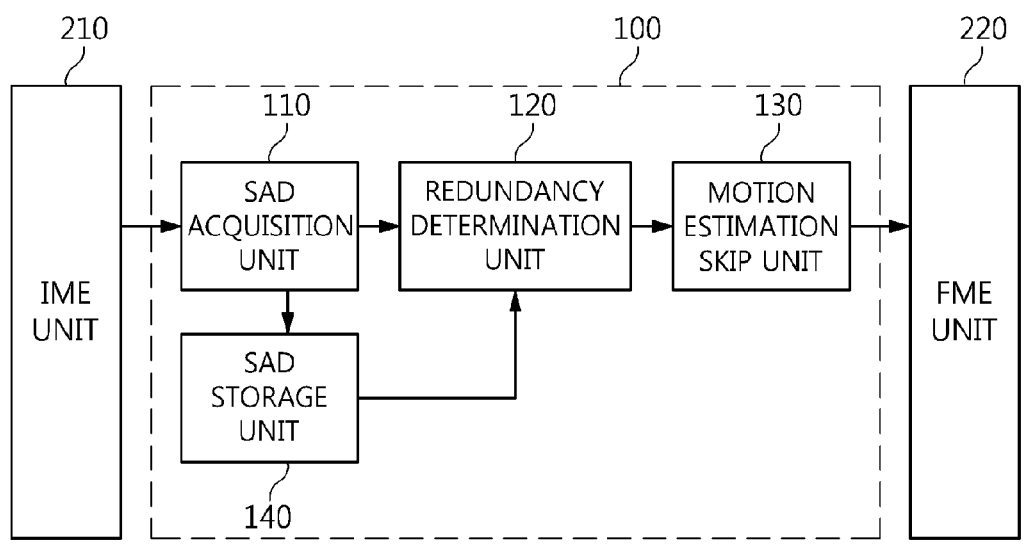
FIG. 2 is a diagram showing an example of a system to which the apparatus for skipping FME in HEVC according to an embodiment of the present invention has been applied.

FIG. 2 is a diagram showing an example of a system to which the apparatus for skipping FME in HEVC according to an embodiment of the present invention has been applied.

Referring to FIG. 2, the system to which the apparatus for skipping FME in HEVC according to an embodiment of the present invention has been applied includes the apparatus 100 for skipping FME in HEVC, an IME unit 210 and an FME unit 220.

The FME skip apparatus 100 in HEVC includes the SAD acquisition unit 110, the redundancy determination unit 120, the motion estimation skip unit 130, and the SAD storage unit 140.

The SAD acquisition unit 110 acquires current SAD of a CTB from an IME unit 210 when the IME unit 210 performs IME on the CTB.

The current SAD may be any one of SADs that are acquired when the IME unit 210 performs IME on a current image and a previous image on a CTB basis.

The CTB may include a current block, a left block, an upper block, and an upper-right block.

The redundancy determination unit 120 determines whether or not the CTB is an estimated redundant block by using the current SAD.

The redundancy determination unit 120 may calculate a first calculated value using the current SAD and a first weight, may calculate a second calculated value using previous SAD, acquired from the previous CTB, and a second weight, and may determine whether or not the CTB is an estimated redundant block depending on which of the first and second calculated values is larger.

If the first calculated value is larger than the second calculated value, the redundancy determination unit 120 may determine the CTB to be an estimated redundant block.

The first calculated value may be acquired by multiplying the current SAD by a first weight, and the second calculated value may be acquired by multiplying the previous SAD by a second weight.

The first weight may be larger than the second weight.

For example, if a first weight is 1, the second weight may be 0.7.

For another example, if the second weight is 1, the first weight may be 1.4.

In this case, the first weight may be 1.

For example, if the first weight is 1, the redundancy determination unit 120 may set the current SAD to be the first calculated value, may calculate the second calculated value using the previous SAD and the second weight, and may determine whether or not the CTB is an estimated redundant block depending on which of the first and second calculated values is larger.

In this case, the second weight may be 1.

For example, if the second weight is 1, the redundancy determination unit 120 may calculate the first calculated value using the current SAD and the first weight, may set the previous SAD to be the second calculated value, and may determine whether or not the CTB is the estimated redundant block depending on which of the first and second calculated values is larger.

In this case, the first calculated value may be acquired by dividing the current SAD by a first weight, and the second calculated value may be acquired by dividing the previous SAD by a second weight.

In this case, the first weight may be smaller than a second weight.

For example, if the second weight is 1, the first weight may be 0.7.

For another example, if the first weight is 1, the second weight may be 1.4.

The motion estimation skip unit 130 may provide the FME unit 220 with the FME skip signal of the CTB depending on whether or not the CTB is an estimated redundant block.

If the CTB is an estimated redundant block, the motion estimation skip unit 130 may provide the FME unit 220 with the FME skip signal of the CTB.

If the CTB is not an estimated redundant block, the motion estimation skip unit 130 may not provide the FME unit 220 with the FME skip signal of the CTB.

If the CTB is not an estimated redundant block, the motion estimation skip unit 130 may provide the FME unit 220 with the FME execution signal of the CTB.

In this case, the SAD storage unit 140 may store the current SAD.

In this case, the SAD storage unit 140 may provide the stored current SAD to the redundancy determination unit 120 as the previous SAD.

The IME unit 210 may include an IME image storage unit configured to store a current image and a previous image, a SAD calculation unit, and a minimum motion vector selection unit.

The IME unit 210 transfers the current SAD, calculated by performing IME on each CTB, to the apparatus 100 for skipping FME in HEVC.

The IME unit 210 may transfer the current SAD, calculated by performing IME, to the apparatus 100 for skipping FME in HEVC using the current image and the previous image.

The FME unit 220 may include an FME image storage unit configured to store the current image and the previous image, a half pixel calculation unit, a ¼ pixel calculation unit, an FME control unit, and an address generation unit.

If the FME skip signal of the CTB is provided by the apparatus 100 for skipping FME in HEVC, the FME unit 220 may skip the FME of the CTB.

If the FME skip signal of the CTB is not provided by the apparatus 100 for skipping FME in HEVC, the FME unit 220 may perform the FME of the CTB.

If the FME execution signal of the CTB is provided by the apparatus 100 for skipping FME in HEVC, the FME unit 220 may perform the FME of the CTB.

Although not shown in FIG. 2, the system to which the apparatus for skipping FME in HEVC according to an embodiment of the present invention has been applied may further include the top controller configured to control the apparatus 100 for skipping FME in HEVC, the IME unit 210, and the FME unit 220.

Figure 3:
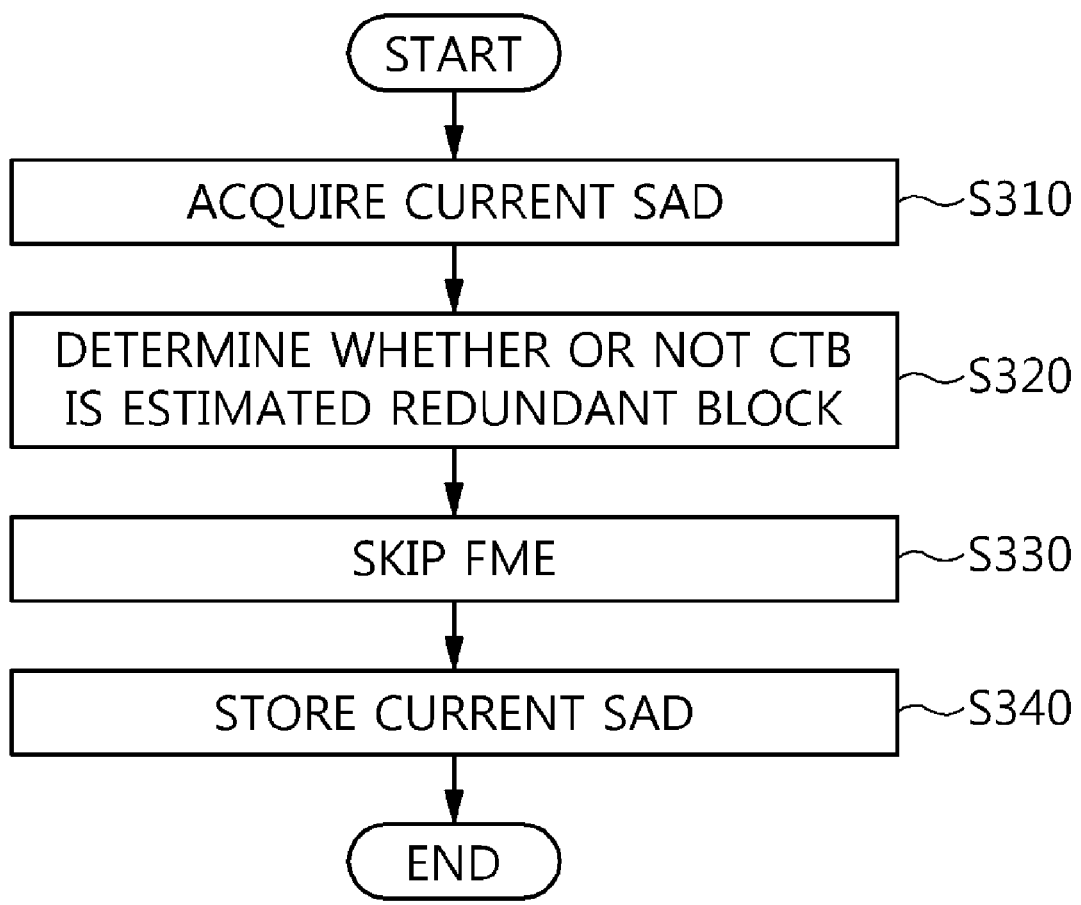
FIG. 3 is a flowchart illustrating a method of skipping FME in HEVC according to an embodiment of the present invention.

FIG. 3 is a flowchart illustrating a method of skipping FME in HEVC according to an embodiment of the present invention.

Referring to FIG. 3, in the method for skipping FME in HEVC according to an embodiment of the present invention, if the IME unit performs IME on a CTB, the current SAD of the CTB is acquired from the IME unit at step S310.

The current SAD may be any one of SADs that are acquired when the IME is performed on a current image and a previous image on a CTB basis.

The IME unit may include the image storage unit configured to store the current image and the previous image, the SAD calculation unit, and the minimum motion vector selection unit.

The IME unit may be controlled by the top controller.

The CTB may include a current block, a left block, an upper block, and an upper-right block.

Thereafter, in the method for skipping FME in HEVC according to an embodiment of the present invention, whether or not the CTB is an estimated redundant block is determined using the current SAD at step S320.

At step S320, a first calculated value may be calculated using the current SAD and a first weight, a second calculated value may be calculated using previous SAD acquired based on a previous CTB and a second weight, and whether or not the CTB is the estimated redundant block may be determined depending on which of the first and second calculated values is larger.

At step S320, if the first calculated value is larger than the second calculated value, it may be determined that the CTB is an estimated redundant block.

The first calculated value may be acquired by multiplying the current SAD by a first weight, and the second calculated value may be acquired by multiplying the previous SAD by a second weight.

The first weight may be larger than the second weight.

For example, if the first weight is 1, the second weight may be 0.7.

For another example, if the second weight is 1, the first weight may be 1.4.

In this case, the first weight may be 1.

For example, at step S320, the current SAD may be set to be the first calculated value, the second calculated value may be calculated using the previous SAD and a second weight, and whether or not the CTB is an estimated redundant block may be determined depending on which of the first and second calculated values is larger.

In this case, the second weight may be 1.

For example, at step S320, the first calculated value may be calculated using the current SAD and the first weight, the previous SAD may be set to the second calculated value, and whether or not the CTB is an estimated redundant block may be determined depending on which of the first and second calculated values is larger.

In this case, the first calculated value may be acquired by dividing the current SAD by a first weight, and the second calculated value may be acquired by dividing the previous SAD by a second weight.

The first weight may be smaller than the second weight.

For example, if the second weight is 1, the first weight may be 0.7.

For another example, if the first weight is 1, the second weight may be 1.4.

Thereafter, in the method for skipping FME in HEVC according to an embodiment of the present invention, the FME skip signal of the CTB is provided to the FME unit depending on whether the CTB is the estimated redundant block at step S330.

In this case, the FME unit may include the image storage unit configured to store a current image and a previous image, the half pixel calculation unit, the ¼ pixel calculation unit, the FME control unit, and the address generation unit.

The FME unit may be controlled by the top controller.

Thereafter, in the method for skipping FME in HEVC according to this embodiment of the present invention, the current SAD is stored at step S340.

Figure 4:
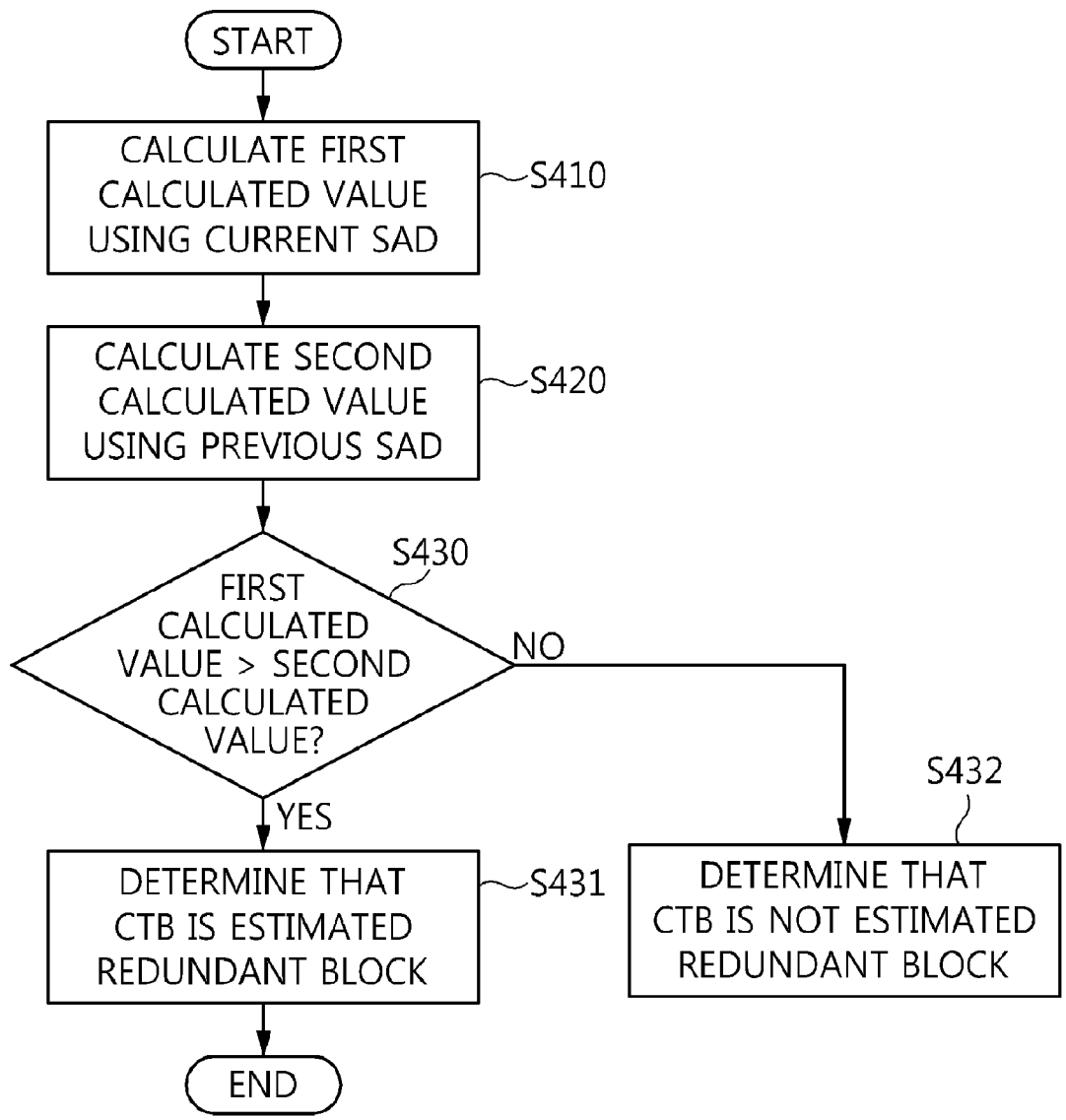
FIG. 4 is a detailed flowchart illustrating the step of determining whether or not a CTB is an estimated redundant block shown in FIG. 3.

FIG. 4 is a detailed flowchart illustrating the step of determining whether or not the CTB is an estimated redundant block shown in FIG. 3.

Referring to FIG. 4, in step S320 of determining whether or not the CTB is an estimated redundant block shown in FIG. 3, when the IME unit performs IME on the CTB, a first calculated value is calculated using the current SAD of the CTB, acquired from the IME unit, and the first weight at step S410.

The first calculated value may be acquired by multiplying the current SAD by the first weight.

The first calculated value may include a value acquired by multiplying the current SAD by the first weight.

The first calculated value may be acquired by dividing the current SAD by the first weight.

The first calculated value may include a value acquired by dividing the current SAD by the first weight.

The first weight may be 1.

For example, at step S410, if the first weight is 1, the current SAD may be set to the first calculated value.

Thereafter, at step S320 of determining whether or not the CTB is an estimated redundant block shown in FIG. 3, the second calculated value is calculated using previous SAD acquired based on a previous CTB and the second weight at step S420.

The second calculated value may be acquired by multiplying the previous SAD by the second weight.

The second calculated value may include a value acquired by multiplying the previous SAD by the second weight.

The second calculated value may be acquired by dividing the previous SAD by the second weight.

The second calculated value may include a value acquired by dividing the previous SAD by the second weight.

The second weight may be 1.

For example, at step S420, if the second weight is 1, the previous SAD may be set to the second calculated value.

In this case, if the first calculated value is acquired by multiplying the current SAD by the first weight and the second calculated value is acquired by multiplying the previous SAD by the second weight, the first weight may be larger than the second weight.

For example, if the first calculated value is acquired by multiplying the current SAD by the first weight and the second calculated value is acquired by multiplying the previous SAD by the second weight, the first weight may be 1 and a second weight may be 0.7.

For another example, if the first calculated value is acquired by multiplying the current SAD by the first weight and the second calculated value is acquired by multiplying the previous SAD by the second weight, the second weight may be 1 and the first weight may be 1.4.

In this case, if the first calculated value is acquired by dividing the current SAD by the first weight and the second calculated value is acquired by dividing the previous SAD by the second weight, the first weight may be smaller than the second weight.

If the first calculated value is acquired by dividing the current SAD by the first weight and the second calculated value is acquired by dividing the previous SAD by the second weight, the second weight may be 1 and the first weight may be 0.7.

For example, if the first calculated value is acquired by dividing the current SAD by the first weight and the second calculated value is acquired by dividing the previous SAD by the second weight, the first weight may be 1 and the second weight may be 1.4.

Thereafter, at step S320 of determining whether or not the CTB is the estimated redundant block shown in FIG. 3, whether or not the CTB is an estimated redundant block is determined depending on which of the first and second calculated values is larger at step S430.

If, as a result of the determination at step S430, it is determined that the first calculated value is larger than the second calculated value, it may be determined that the CTB is an estimated redundant block at step S431.

If, as a result of the determination at step S430, it is determined that the first calculated value is not larger than the second calculated value, it may be determined that the CTB is not an estimated redundant block at step S432.

As described above, in accordance with at least one embodiment of the present invention, a current SAD value is compared with a previous SAD value on a CTB basis and then FME is skipped based on the results of the comparison, thereby enabling more rapid HEVC to be achieved.

In accordance with at least one embodiment of the present invention, if a calculated value using a current SAD value is larger than a calculated value using a previous SAD value, FME is skipped because this case has a good possibility of redundant information in which FME results overlap IME results, thereby enabling more rapid HEVC to be achieved.

In accordance with at least one embodiment of the present invention, a weight applied to a previous SAD value is set to a value lower than to a weight applied a current SAD value, and thus the probability of redundant information being eliminated is increased compared to the case where a current SAD value is simply compared with a previous SAD value, thereby enabling more rapid HEVC to be achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for skipping fractional motion estimation (FME) in high efficiency video coding (HEVC), the apparatus comprising:
a sum of absolute differences (SAD) acquisition unit configured to acquire a current SAD from an integer motion estimation (IME) unit when the IME unit performs IME on a coding tree block (CTB);
a redundancy determination unit configured to determine whether or not the CTB is an estimated redundant block using the current SAD,
wherein the redundancy determination unit calculates a first calculated value using the current SAD and a first weight, calculates a second calculated value using a previous SAD acquired from a previous CTB and a second weight, and determines whether or not the CTB is an estimated redundant block depending on which of the first and second calculated values is larger; and
a motion estimation skip unit configured to provide an FME unit with an FME skip signal of the CTB for skipping the FME in the HEVC depending on whether or not the CTB is an estimated redundant block.

2. The apparatus of claim 1, wherein if the first calculated value is larger than the second calculated value, the redundancy determination unit determines the CTB to be an estimated redundant block.

3. The apparatus of claim 2, wherein:
the first calculated value is acquired by multiplying the current SAD by the first weight; and
the second calculated value is acquired by multiplying the previous SAD by the second weight.

4. The apparatus of claim 3, wherein the first weight is larger than the second weight.

5. The apparatus of claim 4, further comprising a SAD storage unit configured to store the current SAD.

6. The apparatus of claim 4, wherein the first weight is 1.

7. The apparatus of claim 4, wherein the second weight is 1.

8. The apparatus of claim 2, wherein:
the first calculated value is acquired by dividing the current SAD by the first weight; and
the second calculated value is acquired by dividing the previous SAD by the second weight.

9. The apparatus of claim 8, wherein the first weight is smaller than the second weight.

10. A method of skipping fractional motion estimation (FME) in high efficiency video coding (HEVC), the method comprising:
acquiring a current sum of absolute differences (SAD) from an integer motion estimation (IME) unit when the IME unit performs IME on a coding tree block (CTB);
determining whether or not the CTB is an estimated redundant block using the current SAD,
wherein determining whether or not the CTB is an estimated redundant block comprises calculating a first calculated value using the current SAD and a first weight, calculating a second calculated value using a previous SAD acquired from a previous CTB and a second weight, and determining whether or not the CTB is an estimated redundant block depending on which of the first and second calculated values is larger; and
providing an FME unit with an FME skip signal of the CTB for skipping the FME in the HEVC depending on whether or not the CTB is an estimated redundant block.

11. The method of claim 10, wherein determining whether or not the CTB is an estimated redundant block comprises determining the CTB to be an estimated redundant block if the first calculated value is larger than the second calculated value.

12. The method of claim 11, wherein:
the first calculated value is acquired by multiplying the current SAD by the first weight; and
the second calculated value is acquired by multiplying the previous SAD by the second weight.

13. The method of claim 12, wherein the first weight is larger than the second weight.

14. The method of claim 13, further comprising storing the current SAD.

15. The method of claim 13, wherein the first weight is 1.

16. The method of claim 13, wherein the second weight is 1.

17. The method of claim 11, wherein:
the first calculated value is acquired by dividing the current SAD by the first weight; and
the second calculated value is acquired by dividing the previous SAD by the second weight.

18. The method of claim 17, wherein the first weight is smaller than the second weight.

* * * * *